Dec. 13, 1966  R. N. MOYER  3,291,711
TREATING ELECTRODE AND PROCESS
Filed March 12, 1963
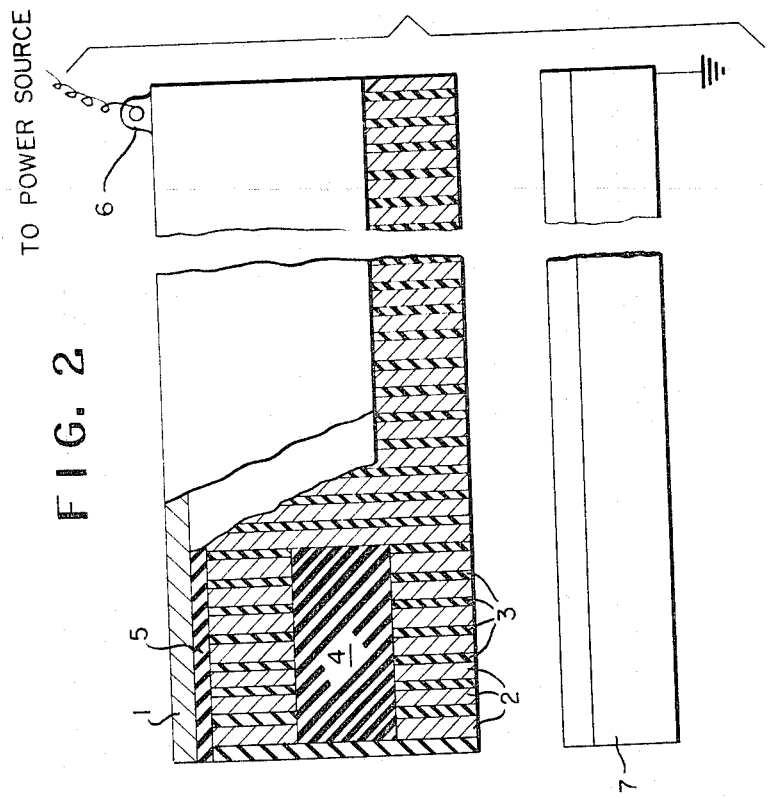
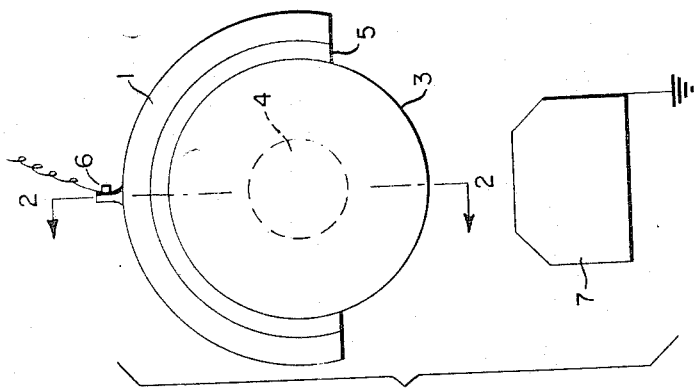
INVENTOR
RICHARD NELSON MOYER
BY *C. Ralph Snyder*
ATTORNEY

United States Patent Office 3,291,711
Patented Dec. 13, 1966

3,291,711
TREATING ELECTRODE AND PROCESS
Richard Nelson Moyer, Buffalo, N.Y., assignor to E. I. du Pont de Nemours and Company, Wilmington, Del., a corporation of Delaware
Filed Mar. 12, 1963, Ser. No. 265,314
2 Claims. (Cl. 204—165)

This invention relates to the treatment of plastic structures and more particularly to an improved electrode structure useful in the treatment of the surfaces of structures of polymeric material for rendering said surfaces more readily adhereable to other materials.

The surfaces of polymeric films and other shaped structures have been rendered receptive to printing inks, adhesives and a variety of coatings by various chemical and flame treatments and particularly by subjecting the polymeric surfaces to the action of an electrical discharge. Such latter treatment is customarily carried out by passing the film or shaped structure through a zone of electrical discharge maintained between a pair of electrodes. At the energy levels necessary to effect a satisfactory treatment at economic throughputs, dielectric breakdown i.e. "spark-through" occurs rather frequently. Spark-through occurs when an area of the shaped structure of lower than normal resistance to dielectric breakdown traverses the gap between the treating electrodes. Such areas include holes in the structure, thinner than normal regions or inclusions of some foreign material of lower dielectric strength. When such an area traverses the gap between the treating electrodes, the electrical energy channels through this area (the path of least electrical resistance) of the shaped structure, and is dissipated as a single intense spark. During spark-through the regions of the shaped structure traversing the zone of electrical discharge simultaneously with the area of lower dielectric strength are not treated. Further, if the area of lower dielectric strength is other than a hole through the structure, then certainly, after spark-through, a hole will exist. In addition, spark-through tends to erode the faces of the treating electrodes and local heating is so intense during spark-through at some commercially employed energy levels that a melting or flaming tear is sometimes propagated in a continuously advancing polymeric film.

A principal object therefore is to provide an improved apparatus and process for the electrical discharge treatment of plastic (i.e. organic polymeric) structures. Another object is to provide an improved electrode structure which will function to treat plastic surfaces even under conditions normally tending to cause spark-through. Still another object is to provide an improved electrode structure adapted for use in the continuous electrical discharge treatment of plastic film, netting, woven and nonwoven fabrics, etc. The foregoing and additional objects will more clearly appear from the description which follows.

These objects are realized by the present invention which, briefly stated, comprises an elongated electrode for use in subjecting a moving polymeric shaped structure to the action of an electrical discharge, said electrical discharge established and maintained by application of a difference in electrical potential of alternating polarity between said elongated electrode and a second electrode displaced uniformly therefrom, both said electrodes extending transversely of the direction of travel of said moving polymeric shaped structure, said elongated electrode comprising a first elongated electrically conductive portion extending the entire length of said electrode, a second lamellate portion of substantially the same length as said first portion and separated therefrom by a third elongated dielectric portion contiguous to both said first and second portions over their coextensive lengths, said lamellate portion comprising a plurality of lamellae, serially contiguous over substantially their entire planar surfaces and alternately of electrically conductive and dielectric material, the plane of each said lamella being substantially parallel to the direction of travel of said polymeric shaped structure and extending transversely of the longitudinal dimension of said elongated electrode, said first elongated electrically conductive portion being adapted for electrical connection to permit the application of a difference in electrical potential of alternating polarity between said elongated electrode and said second electrode whereby to establish and maintain an electrical discharge in the gap between said second electrode and the lamellate portion of said elongated electrode.

A preferred embodiment of my invention is illustrated in the accompanying drawing wherein:

FIGURE 1 is an end view of a pair of electrodes, including an electrode embodying the features of this invention, adapted for the electrostatic discharge treatment of flat film; and FIGURE 2 is a side view, partly in section, of the electrode arrangement of FIGURE 1.

Referring to the drawing, the novel electrode of this invention comprises, in combination, a first elongated electrically conductive portion 1, a second or lamellate portion of substantially the same length as the first portion and consisting of a series of annulus-shaped lamellae 2 and 3 having the same planar dimensions and being of electrically conductive and dielectric material respectively, alternately disposed in contacting relationship on elongated dielectric support portion 4 which is parallel to and substantially coextensive with portion 1. The plane of each lamella of the lamellate portion is perpendicular to the longitudinal axis of said first portion, and an intermediate or spacer dielectric portion 5, contiguous to the first and lamellate portions, serves to space and electrically insulate portion 1 from the lamellate portion of the electrode. A terminal lug 6 provides for suitable electrical connection of portion 1 to a suitable source of power (not shown). A second elongated electrode 7 of electrically conductive material which may be of any conventional design or which may be of the novel construction described above, is disposed parallel to, and is coextensive with, the electrode first described and is spaced therefrom whereby to provide a gap across which an electrical discharge of suitable character is established and maintained, and through which film (not shown) is passed for treatment.

The dielectric and electrically conducting lamellae which constitute the lamellate portion of the improved electrode of this invention are, by definition, thin plates, disks, wafers or similarly shaped pieces, measuring substantially greater in the two dimensions which define their planar shape than in their thickness direction, measured across an edge.

The dielectric lamellae may be fabricated from a wide variety of normally solid dielectric materials including naturally occurring dielectric materials such as mica and asbestos; synthetic dielectric materials such as thermoplastic polymers among which may be mentioned polytetrafluoroethylene, copolymers of tetrafluoroethylene with hexafluoropropylene, polychlorotrifluoroethylene, polyacetals, polycarbonates, polyamides, polystyrene, polyacrylonitrile, copolymers of styrene with acrylonitrile, polyethylene terephthalate, polyvinyl chloride, copolymers of vinyl chloride with vinyl acetate or vinylidene chloride, polyvinyl fluoride, polyvinylidene fluoride, linear polypropylene, polyethylenes, chlorinated polyethers, polymethyl methacrylate, polyimides, cellulose propionate, cellulose acetate butyrate, cellulose acetate and polyurethane; thermosetting polymers including those based on phenol-formaldehyde, furane and polyester systems and particularly those based on melamineformaldehyde, epoxy and silicone systems; also resin-impregnated papers and textiles as well as ceramics.

The dielectric lamellae must be thick enough so that they serve to isolate the electrically conductive lamellae from one another under the conditions of electrical stress prevailing during the operation of the treating apparatus and also to minimize transfer of electrical energy from one electrically conductive lamella to another. This minimum thickness will vary with the dielectric characteristics of the particular material chosen and, to some extent, the ability to provide this material in the thicknesses desired. For example, dielectric lamellae as thin as 0.15 mil have been successfully employed.

It is preferred that each dielectric lamella be in intimate contact with the contiguous electrically conductive lamellae which it separates. To further minimize the interlamellar transfer of electrical energy mentioned above, it is preferred that the dielectric and electrically conductive lamellae be of the same shape and have substantially equal planar surface areas and also that this planar surface area (and consequently the cross sectional area of the lamellate portion of the improved electrode of this invention) be as small as will be consistent with the construction of a lamellate electrode having the mechanical strength required for the intended treating application.

The electrically conductive lamellae may be fabricated from metals such as aluminum, various steels, copper, brasses, zinc, cadmium, nickel, chromium, and a variety of alloys of these metals. Suitable electrically conductive lamellae may also be fabricated from graphite. Electrically conductive metal lamella having thicknesses up to ⅛-inch have been successfully employed. Electrically conductive lamellae fabricated from metal foils as thin as 0.25 mil have also been successfully employed in fabricating the improved electrode and carrying out the process of this invention therewith.

The lamellate portion of the improved electrode of this invention may be assembled by alternating discrete electrically conductive lamellae with preformed dielectric lamellae or with dielectric lamellae formed in situ. Mica, asbestos, ceramics, resin-impregnated papers and textile materials, and thermoplastic polymers which are readily available in film or sheet form comprise the bulk of dielectric materials from which preformed lamellae may be fabricated. Dielectric lamellae may be fabricated in situ from any of the hereinbefore mentioned thermosetting resins.

Both the dielectric and electrically conductive lamellae from which the lamellate portion of the improved electrode of this invention is fabricated may be employed as separate and discrete lamellae or they may be employed as components of composite laminar constructions such as may be fabricated by (1) bonding a thermoplastic polymeric film to a metallic substrate; i.e. foil; (2) metallizing one or both surfaces of a film or sheet of a thermoplastic or thermosetting polymer either by vacuum evaporation or electroless deposition techniques, preferably followed by conventional electroplating to build up a metallic layer of some strength; or (3) curing a layer of a thermosetting polymer in situ on a metallic substrate.

The elongated intermediate (spacer) dielectric component of the improved electrode of this invention may be made from any of the hereinbefore mentioned materials from which the dielectric lamellae may be fabricated. It should be substantially the same length as the elongated electrically conductive and lamellate portions which it separates and thick enough to isolate these portions from each other under the conditions of electrical stress prevailing during the operation of the treating apparatus and also to minimize transfer of electrical energy from the elongated electrically conductive portion to the lamellate portion. This minimum thickness will vary for the same reasons indicated above in discussing the dielectric lamellae.

It is not necessary, of course, that the lamellate portion of this improved electrode have a circular cross section, inasmuch as this portion of the electrode may present any convenient contour toward the second electrode (which itself may be a lamellate electrode similarly or otherwise contoured) including flat, slightly rounded knife-edge, and either a convex or concave curvature. Such contours may be obtained either by providing both dielectric and electrically conductive lamellae having the shape desired in the cross section of the finished electrode or by machining the lamellate portion of the electrode after it has been unitized to provide the necessary mechanical strength.

Further, it is not necessary that the lamellate portion of the improved electrodes of this invention have a centrally positioned dielectric core (rod 4 in FIGURE 2) but it will be obvious that such a construction is preferred where it provides a convenient means of aligning preformed washer-like lamellae as well as where it adds to the mechanical strength of the finished electrode.

It is also within the purview of this invention to unitize the electrode structure by the in situ curing of a thermosetting resin in a suitable mold cavity containing aligned electrically conductive lamellae and the elongated electrically conductive member whereby the dielectric lamellae and spacer element are formed as a unit in contact with the conductor elements of the electrode. Similarly unitized electrode structures may be formed by introducing a melt of thermoplastic resin in the mold cavity followed by a cooling (setting) step. Thermoplastic polymeric dielectric materials (whether employed as preformed films or as melts) and in situ curing thermosetting polymeric dielectric materials may both be provided with fibrous reinforcement, glass and asbestos fibers being most commonly employed.

Without departing from the spirit of the invention, it will be obvious that when employing washer-like lamellae, the dielectric core (rod 4 in FIGURE 2) may be replaced by a metal, e.g., steel rod covered with a dielectric covering having the same outer diameter as the original dielectric core. The metal rod may be connected to the electrical power source and thus it, in combination with its own dielectric covering, may serve in place of the exteriorly disposed "first elongated electrically conductive portion 1 and the intermediate or spacer dielectric portion 5" which may now be dispensed with.

Although in their preferred embodiment the electrodes are described as straight bar-type electrodes, it is obvious that the improved elongated, lamellate electrodes of this invention may be fabricated in a circular or ring-like configuration as well, in which form they may be successfully employed to treat tubular forms of any of the hereinbefore mentioned polymeric structures, particularly tubular films and pipe, plastic bottles, tubular knit textiles and plastic netting extruded in tubular form.

Where it has been found advantageous in treating certain polymers to provide a particular gaseous atmosphere wherein to establish and maintain the electrical discharge, such an atmosphere may be conveniently supplied through a manifold formed in the lamellate portion of the improved electrodes of this invention by boring a hole longitudinally through the center of the dielectric core and then milling a longitudinal slot in the working face of the electrode communicating with this hole.

In carrying out the process of this invention, the high voltage electrode is connected to a source of alternating electrical potential, preferably a high frequency, high voltage source, such as is shown for example in U.S. Patents 3,018,189 (Traver), 2,939,956 (Parks), 2,894,139 (Magruder et al.), 2,882,412 (Cunningham), and 2,859,481 (Kaghan et al.). The difference in electrical potential between the treating electrodes can vary from voltages in the vicinity of 1,000 volts up to pulsating peak voltages as high as 100,000 volts and above. In general, it is preferred to maintain the voltage above 2,000 volts, i.e., 2,000–100,000 volts. Frequencies ranging from 60 cycles per second to 1 million cycles per second can be used successfully. Frequencies in the range of 1,000–500,000 cycles per second are preferred in order to obtain effective treatment at commercially acceptable exposure times.

In treating polymeric shaped structures, particularly films and other web or sheet-like structures with the apparatus and according to the process of this invention, such structures hereinafter termed "webs" for simplicity of reference, a lamellate high voltage electrode may be employed in conjunction with a grounded electrode which, as pointed out hereinabove, may variously be a conventional metal bar-type electrode, a rotatable metal roll or may itself be a lamellate electrode having its elongated electrically conductive first portion grounded electrically. Alternatively, the process of this invention may be carried out by employing a grounded lamellate electrode in conjunction with a high voltage electrode which may be conveniently either the aforementioned bar or rotatable roll.

Where it is desired to treat but one surface of a polymeric web, the combination of a lamellate electrode and a rotatable metal roll is preferred, with the surface of the web not to be treated being maintained in contact with the roll while traversing the zone of electrical discharge. Where it is desired to treat both surfaces of a polymeric web, the combinations of either two lamellate electrodes or one lamellate electrode and one bar-type electrode may conveniently be employed, the web traversing the zone of electrical discharge while being maintained out of contact with either electrode. The two-surface treating technique may be employed to treat one surface of each of two polymeric webs simultaneously by passing them through the zone of electrical discharge in back-to-back relationship while maintaining their outwardly facing surfaces out of contact with the respectively facing electrodes.

The process and apparatus of this invention obviously may be employed for the electrical discharge treatment of any polymeric shaped structure susceptible to electrical discharge treatment for purposes hereinabove set forth, and is particularly applicable to polymeric shaped structures which comprise essentially portions of substantially uniform resistance to dielectric breakdown surrounding regions of substantially lower resistance to dielectric breakdown. Among such structures may be mentioned perforated and non-perforated films, extruded and molded plastic netting, woven textiles and non-woven textiles and paper-like structures formed from polymeric materials such as branched polyethylene, linear polyethylene, linear isotactic polypropylene, blends of linear and branched polyethylenes, polyacrylonitrile, polyoxymethylene, polyvinyl chloride, copolymers of vinyl chloride with vinylidene chloride, polystyrene, polyvinyl fluoride, polyvinylidene fluoride, copolymers of ethylene with ethyl acrylate, partially neutralized copolymers of ethylene with methacrylic acid, copolymers of tetrafluoroethylene with hexafluoropropylene and other perfluoromonoolefins, copolymers of hexafluoropropylene with vinylidene fluoride, linear polyamides such as polycaprolactam, polyhexamethylene adipamide and polyhexamethylene sebacamide and linear polymeric esters including, among others, those formed by the polycondensation of terephthalic acid with a diol selected from ethylene glycol, diethylene glycol, propylene glycol, 1,4-butanediol and 1,4-cyclohexanedimethanol; those formed by the polycondensation of terephthalic acid with a mixture of (1) ethylene and neopentyl glycols or (2) ethylene glycol and 1,4-cyclohexanedimethanol; those formed by the polycondensation of ethylene glycol with a mixture of terephthalic and isophthalic acids; those formed by the polycondensation of p,p'-bibenzoic acid with a mixture of (1) ethylene and diethylene glycols, (2) neopentyl glycol and diethylene glycol or (3) ethylene glycol and p-xylylene glycol; those formed by the polycondensation of ethylene or diethylene glycols with a mixture of (1) p,p'-bibenzoic acid and succinic acid, (2) p,p'-bibenzoic acid and sebacic acid, (3) p,p'-bibenzoic acid and terephthalic acid or (4) p,p'-bibenzoic acid and isophthalic acid; and those formed by the polycondensation of ethylene glycol with an acid selected from 1,5-naphthalene dicarboxylic acid, 2,6-naphthalene dicarboxylic acid, and 2,7-naphthalene dicarboxylic acid; and polyimides of tetracarboxylic acids and primary diamines, e.g., pyromellitic acid and aromatic primary diamines. Wherever acids are employed in the above-mentioned polycondensations in forming linear polymeric esters, their corresponding lower alkyl esters or acyl chlorides may be substituted.

It will be apparent from the foregoing description that the apparatus and process of this invention provide a simple and economical means for subjecting to the action of an electrical discharge polymeric shaped structures which heretofore could not be treated by conventional means, or which could only be treated by conventional means with, at the very least, periodic interruptions due to dielectric spark-through.

Through the application of the apparatus and process of this invention, polymeric films known to have pin holes and other dielectric discontinuities, woven and non-woven textiles and paper-like polymeric structures with their inherent porosity, and both extruded and molded plastic nettings with their largely open structure may be rendered variously more printable and more receptive to melt-, solution- and dispersion-applied coatings employed for adhesive or other functional reasons. Two particular advantages accrue from the successful electrical discharge treatment of plastic netting: Produce bags made of such netting may now be successfully spot-labeled using conventional heat-activatable, adhesive-coated labels. In addition, such netting may now be employed as a reinforcing ply in adhesive-combined laminar film constructions (for use as tenting, tarpaulins and in the construction of air-supported structures) with a smaller expenditure of adhesive since it can now be applied directly to the netting instead of to the much larger film area.

I claim:

1. An elongated electrode for use in subjecting a moving polymeric shaped structure to the action of an electrical discharge, said electrical discharge established and maintained by application of a difference in electrical potential of alternating polarity between said elongated electrode and a second electrode displaced uniformly therefrom, both said electrodes extending transversely of the direction of travel of said moving polymeric shaped structure, said elongated electrode comprising a first elongated electrically conductive portion extending the entire length of said electrode, a second lamellate portion of substantially the same length as said first portion and separated therefrom by a third elongated dielectric portion contiguous to both said first and second portions over their coextensive lengths, said lamellate portion comprising a plurality of lamellate, serially contiguous over substantially their entire planar surfaces and alternately of electrically conductive and dielectric material, the plane of each said lamella being substantially parallel to the direction of travel of said polymeric shaped structure and extending transversely of the longitudinal dimension of said elongated electrode, said first elongated electrically conductive portion being adapted for electrical connection to permit the application of a difference in electrical potential of alternating polarity between said elongated electrode and said second electrode whereby to establish and maintain an electrical discharge in the gap between said second electrode and the lamellate portion of said elongated electrode.

2. A process for treating a polymeric shaped structure comprised essentially of portions of substantially uniform resistance to dielectric breakdown surrounding regions of substantially lower resistance thereto, comprising passing said shaped structure through a zone of electrical discharge effective to render the surface of said structure exposed to said discharge adherent to printing inks, coating compositions and the like, said zone of electrical discharge being established and maintained by the application of a difference in electrical potential of alternating polarity between two elongated, spaced-apart electrodes, at least one of said electrodes comprising a first elongated electrically conductive portion extending the entire length of said electrode, a second lamellate portion of substantially the same length as said first portion and separated therefrom by a third elongated dielectric portion contiguous to both said first and second portions over their coextensive lengths, said lamellate portion comprising a plurality of lamellae, serially contiguous over substantially their entire planar surfaces and alternately of electrically conductive and dielectric material, the plane of said each lamella being substantially parallel to the direction of travel of the polymeric shaped structure and extending transversely of the longitudinal dimension of said lamellate portion, at least one of said two elongated electrodes being connected to a source of electrical potential of alternating polarity, said other electrode being connected electrically to ground.

References Cited by the Examiner
UNITED STATES PATENTS

| | | | |
|---|---|---|---|
| 2,864,755 | 12/1958 | Rothacker | 204—165 |
| 3,017,339 | 1/1962 | Dewey | 204—165 |
| 3,238,920 | 3/1966 | Fowlie et al. | 118—2 |

JOHN H. MACK, *Primary Examiner.*

H. M. FLOURNOY, *Assistant Examiner.*